United States Patent [19]

Foley

[11] Patent Number: 5,184,227
[45] Date of Patent: Feb. 2, 1993

[54] PHOTOGRAPHIC PRINTER WITH INDEX PRINT GENERATION

[75] Inventor: Walter D. Foley, Rochester, N.Y.

[73] Assignee: Eastman Kodak Company, Rochester, N.Y.

[21] Appl. No.: 795,585

[22] Filed: Nov. 21, 1991

[51] Int. Cl.⁵ ............... H04N 1/387; H04N 1/46; G03B 1/00
[52] U.S. Cl. .................... 358/302; 358/78; 354/120
[58] Field of Search ............... 358/75, 78, 244, 296, 358/302, 909, 76; 354/120, 410

[56] References Cited

U.S. PATENT DOCUMENTS

| | | | |
|---|---|---|---|
| 4,780,756 | 10/1988 | Shiota et al. | 358/78 |
| 4,782,390 | 11/1988 | Hayashi et al. | 358/78 X |
| 4,903,068 | 2/1990 | Shiota | 355/20 |
| 4,933,773 | 6/1990 | Shiota et al. | 358/302 |
| 4,942,462 | 7/1990 | Shiota | 358/78 X |
| 4,951,132 | 8/1990 | Nakade et al. | 358/78 |
| 4,991,004 | 2/1991 | Hayashi et al. | 358/76 |
| 5,057,913 | 10/1991 | Nagata et al. | 358/302 |
| 5,097,340 | 3/1992 | Tanabe et al. | 358/909 X |

Primary Examiner—Benjamin R. Fuller
Assistant Examiner—Eric Frahm
Attorney, Agent, or Firm—Francis H. Boos, Jr.

[57] ABSTRACT

A photographic printer having a print station for generating photographic prints from photographic film frame images and an exposure determination film frame image scanner used in determining print exposure operating conditions at the print station. The printer is provided with an index print signal generator responsive to the output of the exposure determination film scanner to produce a matrix of film frame image signals from which index prints are produced by either the print station or by means of a separate printer.

4 Claims, 1 Drawing Sheet

PHOTOGRAPHIC PRINTER WITH INDEX PRINT GENERATION

FIELD OF INVENTION

The present invention is directed to the art of photographic printing and more specifically to printers adapted to produce index prints in conjunction with the principal photographic printing process.

BACKGROUND

An index print is a single print comprised of a matrix of small images corresponding to individual negative frames on a strip of photographic film. This type of print is desirable for the customer in that positive image reproductions are provided for convenient reference by the customer to indicate the content of the film without having to view the film directly. This is of particular benefit for negative film since the scene content of negative images is difficult to visualize, particularly by an untrained viewer.

At the present time, index prints are not generally produced by photofinishing laboratories although technology for doing so is known. The reason for this is believed to reside in the difficulty of doing so and the cost associated with extra equipment needed to produce the prints. In general, there are two basic techniques known for the production of index prints. One is to optically print the negative film frames onto photographic paper by contact printing or some other type of printing device. The disadvantage of this technique is that it requires separate equipment and extra handling of the film as will as additional time added to the overall print order processing.

Another technique involves scanning the negative frames with an electronic film scanner with equipment over and above that used in the normal photofinishing process and producing the index prints with a hardcopy output device, such as a cathode ray tube (CRT) printer, laser printer, thermal printer or the like. Examples of this technique are found in U.S. Pat. Nos. 4,903,068 and 4,933,773. In the '068 patent a CRT scanning light source is used to expose the film frames onto the photopaper to produce the customer's print order. Simultaneously, a portion of the scanned image light is deflected to auxiliary digital image processing and memory circuits. When a predetermined number of frames have been printed, the corresponding stored digital image are recalled from memory and used to drive the CRT exposure scanner to produce an index print of the stored images as a matrix of reduced-size images on the next available space on the photopaper. The '773 patent is similar except that a non-scanning exposure light source is used for the principal print exposures. A portion of the image exposure light is deflected to a video camera and subsequent processing circuits wherein the image is scanned and digitized for storage in memory. After the appropriate number of frames are printed, the corresponding stored image are recalled from memory and an index print exposure made by means of an auxiliary scanning CRT light source. Both of these examples require significant additional capital investment for the added equipment required.

SUMMARY OF THE INVENTION

According to the invention therefore, a photographic printer is provided of the type having a print station for printing images from photographic film frame images and being adapted to produce index prints of said printed film frame images. The printer comprises exposure determination film frame scanner means independent of the print station for generating scanned frame image signals to be used in determining print exposure operating conditions at the print station. According to the invention there is provided index print signal generating means responsive to the scanned exposure determination film frame image signals for processing and storing such image signals as a matrix of film frame image signals suitable for use in an index print. The printer further comprises output means responsive to a predetermined series of the stored image frame signals for generating an index print therefrom.

DETAILED DESCRIPTION

Figure 1:
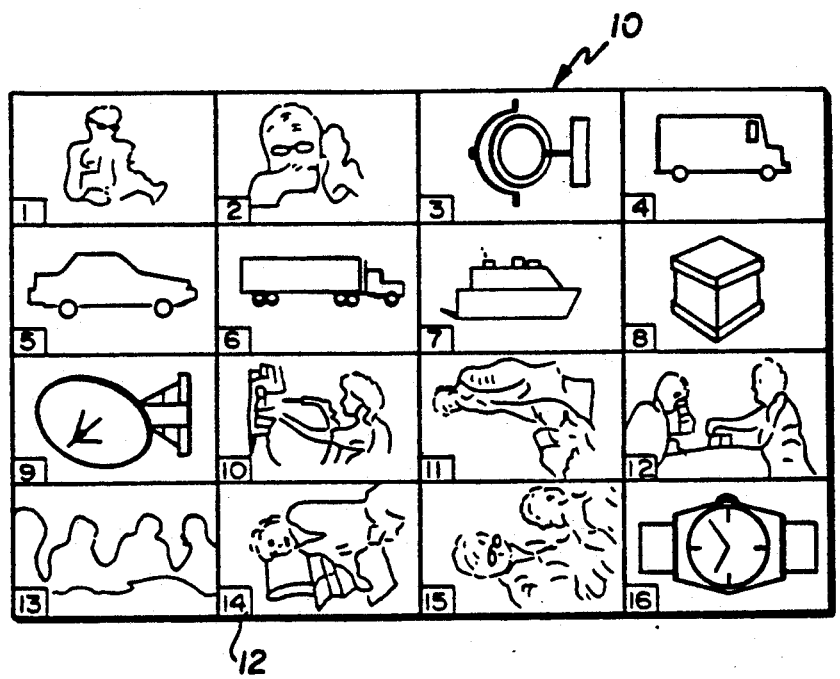
FIG. 1 is a schematic illustration of an index print.

In FIG. 1, a representative index print 10 is shown as comprising a matrix small-sized images which correspond to a predetermined series of image frames (16 in this example) on a roll or strip of photographic film. Each of the index print images bears an image frame number 12 that correlates the particular image on the index print to the corresponding frame image on the photographic film. Thus, a customer can easily determine the content of a film roll or strip without the need to physically view the film. This is of course particularly useful when reordering prints from a photofinisher.

Figure 2:
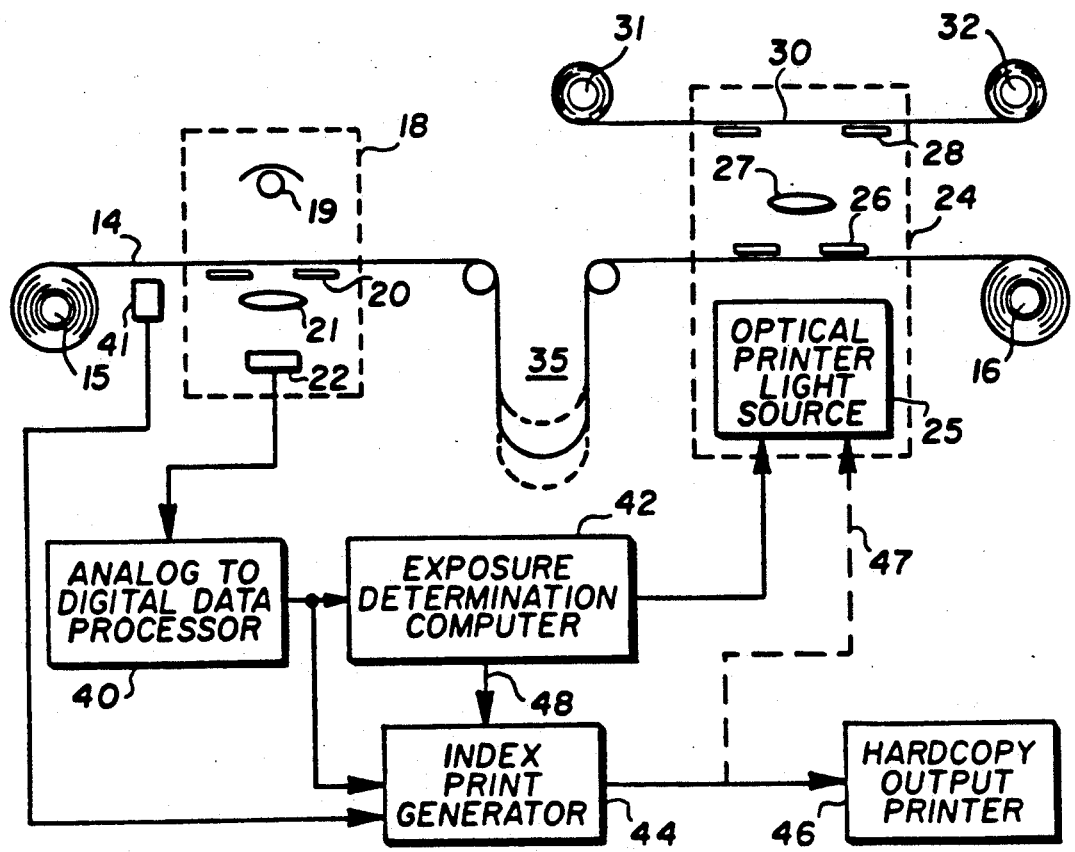
FIG. 2 is schematic diagram of a photographic printer embodying the present invention.

In FIG. 2, a photographic printer adapted for producing index prints according to the present invention is shown. In the illustrated printer, a roll of processed photographic film 14 is advanced by transport means (not shown) from a supply reel 15 through an exposure determination film scanner 18 and a photographic print station 30 to a takeup reel 16. An optional film loop buffer stage 35, of well known construction and operation, may be provided to allow for any momentary differences in the film transport speeds in the scanner 18 and the printer station 30, respectively.

Exposure determination scanner 18 is typically provided with a light source 19 to shine light through a film frame on film 14 positioned in frame gate 20. The resultant image light is focused by lens 21 onto a scanning image sensor 22 which may take the form of any of a variety of scanning devices such as a linear or two dimensional area array charge coupled device (CCD) or a Nipkow disk or video camera. Although scanner 18 is shown with optical focusing of the film image onto sensor 22, it will be appreciated that scanner 18 may employ virtual contact of the type disclosed in coending commonly assigned U.S. application Ser. No. 07/618,132 entitled COLOR FILM SCANNING APPARATUS, the disclosure of which is incorporated herein by reference. The output of sensor 22, in a scanned -pixel analog signal form, is applied to an analog-to-digital data processor 40 to be converted in known manner into digital values representative of the analog pixel information received from scanner sensor 22. This digital data is then applied to an exposure determination computer 42 which operates in well known manner to determine the correct film exposure values for normal optical printing in printer station 24.

Printer station 24 conventionally includes an optical printer light source 25, a film gate 26 focusing optics 27 and a print gate 28. A length of photographic print paper 30 is advanced by suitable transport means (not shown) through print station 24 from supply reel 31 to takeup reel 32 in synchronism with the advance of film 14 and the images on film 14 are successively exposed onto print paper 30 with suitable adjustment of the exposure conditions under the control of the signals from computer 42. What has thus far been described is a conventional photographic printer with film frame image pre-scan capability whereby image pixel data is pre-scanned and digital signals corresponding thereto are used to generate exposure data for making the ultimate print exposure.

In accordance with the invention, the same pixel scan data used to determine print exposure conditions are employed to produce index prints. Thus in a presently preferred embodiment of the invention, the exposure determination digital film frame image signals at the output of processor 40 are applied to index print generator 44 where the film frame image signals are processed and stored as a matrix of film frame image signals suitable for use in producing an index print. Suitable examples of arrangements for producing an index print matrix from scanned image data are described in aforementioned U.S. Pat. Nos. 4,903,068 and 4,933,773, the disclosures of which are incorporated herein by reference, and, consequently, no further discussion of the details is believed to be necessary. Optionally, a frame number reader 41 is provided to input frame counts to index print generator 44 to keep track of the accumulated number of film frames stored in generator 44 and also to correlate the frame numbers to the individual images in the index print matrix.

When a predetermined number of print images are accumulated, the stored image data is then output to means, such as a hard copy printer 46, for generating the desired index print. Hardcopy printer may be any well known form of black-and-white or color printer, depending on the nature of the prints being produced. Examples of suitable printers would be a thermal dye printer, inkjet printer, laser printer, electrophotostatic printer or the like. Alternatively, the output of index printer generator 44 may be applied directly via line 47 to the printer light source 25 in print station 24 for direct printing of the index print on the photographic print paper 30. This assumes, of course, that the exposure light source 25 is capable of outputting scanned print exposure light on a pixel by pixel basis such as in the case of the CRT exposure light source in aforementioned U.S. Pat. Nos. 4,903,068 and 4,933,773.

In a presently preferred form of this invention, scanning means 18 preferably comprises a virtual contact scanner in which optical focusing lens 21 is eliminated and scanner 22 comprised of a tri-linear CCD device is placed closely adjacent the underside of film 14. In this arrangement, scanning sensor 22 comprises a 480 element by 3 line color linear CCD imaging with each line being provided with a color filter to be individually responsive to separate colors in the image. In operation, the sensor images a predetermined film width, such as a 35 mm format negative, with the film motion providing the page or lengthwise scan of the film frame image. Thus, image data is generated in a 480 V by 252 H (vertical by horizontal) format. Exposure determination computer 42 than processes the resulting data by suitable grouping of individual adjacent pixel related data into a standard format size, such as 24 V by 36 H. This is the final form of data applied to exposure determination computer 42 for use in determining the optical photographic exposure conditions at print station 24.

The index print generator 44 receives the same 480 V by 252 H data from the scanner 18 and processor 40 for use in processing and storing the index print information. In a particularly preferred form of the invention, index print generator 44 is adapted to process this data in several modes, depending upon the specific requirement of the output printer system 46. For example, the image data from A/D data processor 40 can be processed and stored in generator 44 in full 480 V by 252 H resolution for high quality index prints. Alternatively, by employing the same type of pixel grouping process used in computer 42, the data can be buffered (stored) in, for example, a 160 V by 252 H resolution for medium quality index prints or in 24 V by 36 H resolution for lower quality index prints, all depending on the output printer system image resolution printing characteristics. The scanned film frame image signals used to generate the index print signal data may be applied directly to the output printer without any exposure correction or they may be adjusted for color and/or density corrections using exposure correction data applied on line 48 from the exposure determination computer 42 to the index print generator 44. In the latter case, the appearance of the index prints is improved to correspond to the prints produced in the customer's regular print order.

It will be appreciated that what has been described is a simple, less expensive photographic printer capable of producing index prints on-line without requiring costly additional equipment or operator intervention. The index prints can be printed in the same sequence as the customer film orders are printed, thus, lending itself to the use of automated film/packaging to automatically package the index prints with the customer's order.

The invention has been described in detail with particular reference to a presently preferred embodiment, but it will be understood that variations and modifications can be effected within the spirit and scope of the invention.

What is claimed is:

1. A photographic printer having a print station for generating photographic prints from photographic film frame images and being adapted to produce index print images corresponding to said photographic prints, the printer comprising:

exposure determination film frame image scanner means independent of the print station for generating scanned film frame image signals to be used in determining print exposure operating conditions at the print station;

index print signal generating means responsive to said scanned film frame image signals for processing and storing said scanned film frame image signals as a matrix of film frame image signals suitable for use in producing an index print;

and printer output means responsive to a predetermined series of the stored scanned film frame image frame signals in said matrix for generating an index print therefrom.

2. The photographic printer of claim 1 wherein said scanned film frame image signals are digital signals representative of pixel-by-pixel analog information derived from scanning of the film frame images.

3. The photographic printer of claim 1 wherein said printer output means has a predetermined image resolution printing characteristic and said index print signal generating means includes means for generating said matrix of image signals at a preselectable resolution adapted to correspond to said image resolution printing characteristic.

4. The photographic printer of claim 1 including computation means responsive to the scanned film frame image signals for generating exposure determination signals for use in generating photographic prints at the print station and means for coupling said exposure determination signals to said index print signal generating means for applying exposure correction to images in the index print whereby index print images produced thereby correspond in appearance to said photographic prints generated at the print station.

* * * * *